(Model.)

S. A. V. HARTWELL.
CAR COUPLING.

No. 255,623. Patented Mar. 28, 1882.

WITNESSES:
Francis McArdle
C. Sedgwick

INVENTOR:
S. A. V. Hartwell
BY Munn & Co.
ATTORNEYS.

United States Patent Office.

SAMUEL A. V. HARTWELL, OF VALLEY CENTRE, KANSAS.

CAR-COUPLING.

SPECIFICATION forming part of Letters Patent No. 255,623, dated March 28, 1882.

Application filed December 9, 1881. (Model.)

*To all whom it may concern:*

Be it known that I, SAMUEL A. V. HARTWELL, of Valley Centre, in the county of Sedgwick and State of Kansas, have invented a new and useful Improvement in Car-Couplings, of which the following is a full, clear, and exact description.

Reference is to be had to the accompanying drawings, forming part of this specification, in which similar letters of reference indicate corresponding parts in both the figures.

Figure 1:
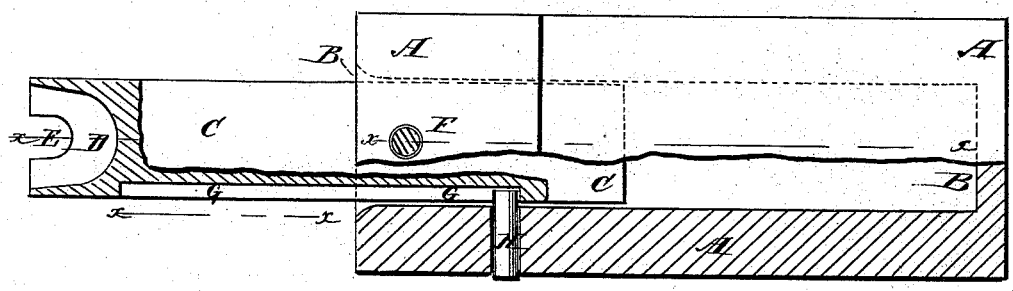
Figure 2:
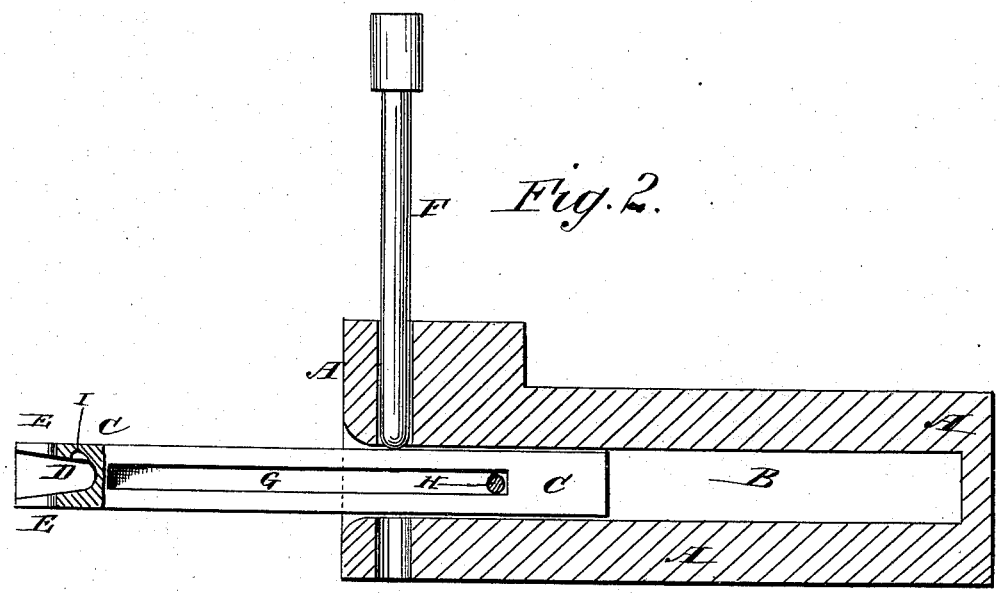

Figures 1 is a plan view, partly in section, of my improvement. Fig. 2 is a sectional side elevation of the same, taken through the line x x x x x, Fig. 1.

The object of this invention is to promote convenience and safety in coupling cars.

The invention consists in a car-coupling constructed of a bumper perforated longitudinally, a sliding center bar having a recessed forward end, and a coupling-pin, whereby the link can be readily and safely guided into place; and also in the combination, with the bumper and the sliding center bar having side groove or slot, of a stop-pin, whereby the said sliding bar is kept in place in the bumper, as will be hereinafter fully described.

A represents the bumper of a car-coupling, which has a rectangular or other shaped perforation, B, formed in it longitudinally.

Into the perforation B is fitted a sliding bar, C, in the forward end of which is formed a recess, D, to receive the coupling-link. The recess D is made hopper-shaped or flaring to guide the entering link into place. In the forward end of the sliding center bar, C, is formed a short slot, E, for the passage of the coupling-pin F.

In the side of the center bar, C, is formed a longitudinal groove, G, to receive the end of a stop-pin, H, which is driven or screwed into a hole in the side of the bumper A to prevent the center bar, C, from being drawn out of the bumper A.

If desired, the groove G can extend through the center bar, C, as a slot, and the stop-pin H can pass through it and through both sides of the bumper A, and can be secured in place by having its ends riveted.

In the end of the center bar, C, at the upper side of the recess D, can be formed a groove, I, to receive the fingers, for convenience in drawing out the said center bar.

In using the improvement the attendant raises the coupling-pin F and draws out the center bar, C, of one car, leaving the end of the pin F resting upon it, and then guides with his hand the link attached to the other car, so that the free end of the link will enter the recess D in the end of the drawn-out bar C. As the cars come together the bar C is pushed back into its bumper, leaving the attendant ample time to withdraw his hand or allow his hand to be pushed to one side by the advancing bumper, so that he can get his hand crushed only by holding it purposely between the bumpers. As the center bar, C, is pushed back into place the coupling-pin F drops through the link and the cars are coupled.

Having thus described my invention, I claim as new and desire to secure by Letters Patent—

1. In a car-coupling, the combination, with a longitudinally-perforated bumper and a coupling-pin, of a sliding center bar having its outer end recessed and adapted to be partly withdrawn from the said bumper, substantially as and for the purpose set forth.

2. In a car-coupling, the combination, with the bumper A, provided with the longitudinal perforation B and the stop-pin H, and the coupling-pin F, of the sliding center bar, C, provided with the recess D, the slot E, and the longitudinal groove G, substantially as and for the purpose set forth.

SAMUEL A. V. HARTWELL.

Witnesses:
ROBT. CARROTHERS,
H. R. DEAN,
A. C. RACE.